Figure 1:
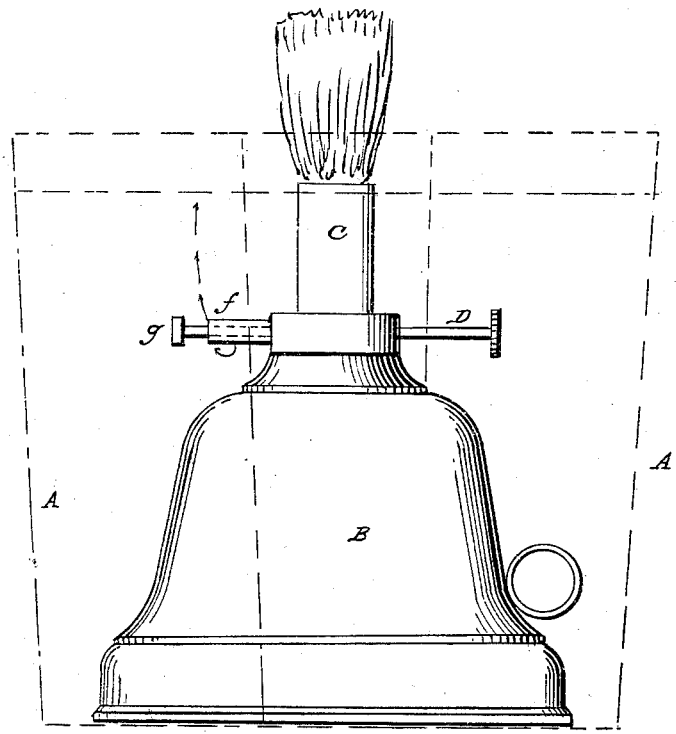
Figure 2:
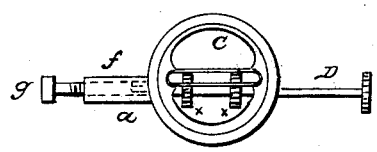
Figure 3:

J. E. NOYES.
Lamp.

No. 82,150.

Patented Sept. 15, 1868.

WITNESSES:

INVENTOR.

United States Patent Office.

JOHN E. NOYES, OF NEW ALBANY, INDIANA.

Letters Patent No. 82,150, dated September 15, 1868.

IMPROVEMENT IN LAMPS.

The Schedule referred to in these Letters Patent and making part of the same.

TO ALL WHOM IT MAY CONCERN:

Be it known that I, JOHN E. NOYES, of New Albany, in the county of Floyd, and in the State of Indiana, have invented certain new and useful Improvements in Lamps; and do hereby declare that the following is a full, clear, and exact description thereof, reference being had to the accompanying drawings, and to the letters of reference marked thereon, making a part of this specification.

In the annexed drawings, B represents an ordinary coal-oil lamp, which has a suitable wick-tube, C, and screw-shaft D, for elevating or depressing the wick in the tube, by means of the usual corrugated rollers. At the opposite side of the wick-tube from the screw-shaft is a hollow shaft, $f$, which projects from the lamp at right angles, and which is provided with a small opening, $i$, on its under side. Within this hollow shaft is a screw, $g$, to be used for regulating the opening $i$, as aforesaid.

This lamp, as constructed, may either be used within an exterior vessel, A, or not, as preferred. When this lamp B is placed within a vessel, it (the vessel A) is filled with the water, so that the top of the wick-tube is even with the top of the water. The can B being filled with oil, and the valve $i$ is open, water will force itself under the oil, and a thin stratum of oil will force itself out of the can and to the top of the water, and the wick be fed therefrom.

When this lamp is not used in the water-filled can, the hollow shaft $f$, with its opening, acts as an air-feed for the wick, as in this case there is no other feed for the air. The size of the opening $i$ is regulated to suit the heavier or lighter oils.

F represents an extra wick-tube, which I may add to the main tube C. This tube F is made of a triangular piece of metal, and wrapped around a suitable wick, so that the upper edges of said wick project from the sides of the metal, as the same is spirally wound. By means of this wick-tube F, I can regulate the height of the light, as there is a flow of air from bottom to top of said tube.

Having thus fully described my invention, what I claim as new, and desire to secure by Letters Patent, is—

1. The lamp B, provided with tube C, hollow shaft $f$, with opening $i$, and screw-regulator $g$, substantially as and for the purposes set forth.

2. The triangular plate, formed into a wick-tube, F, with the projecting edges of the wick, in the manner set forth, and used with the lamp B, as constructed, and for the purposes set forth.

In testimony that I claim the foregoing, I have hereunto set my hand, this 26th day of February, 1868.

J. E. NOYES.

Witnesses:
  V. D. STOCKBRIDGE,
  A. N. MARR.